Figure 1:
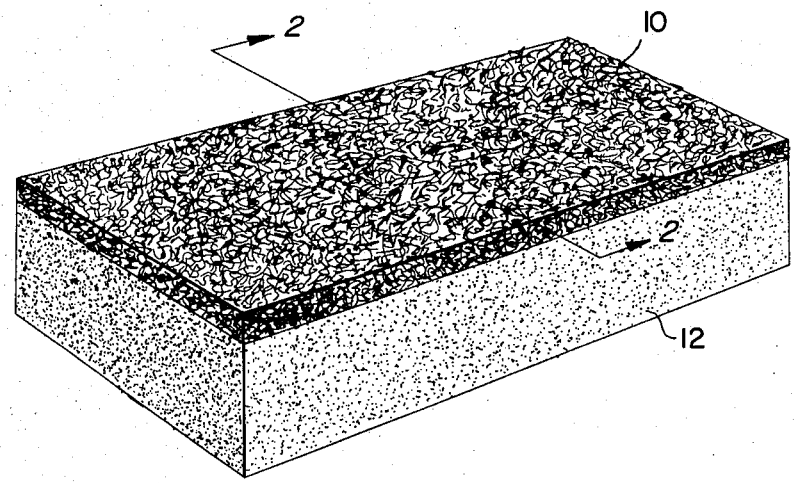

United States Patent [19]

Guthrie

[11] 3,861,993

[45] Jan. 21, 1975

[54] COMPOSITE FOAM SCOURING PAD

[75] Inventor: James L. Guthrie, Ashton, Md.

[73] Assignee: W. R. Grace & Co., New York, N.Y.

[22] Filed: Apr. 20, 1973

[21] Appl. No.: 353,190

Related U.S. Application Data

[63] Continuation-in-part of Ser. No. 332,053, Feb. 13, 1973.

[52] U.S. Cl. .................. 161/159, 15/118, 156/78, 161/190
[51] Int. Cl. ............................................. B32b 3/26
[58] Field of Search ............ 161/159, 190; 156/78; 15/104.93, 118

[56] References Cited
UNITED STATES PATENTS

| | | | |
|---|---|---|---|
| 2,927,876 | 3/1960 | Hoppe et al. | 161/159 |
| 3,072,582 | 6/1963 | Frost | 161/190 |
| 3,325,338 | 6/1967 | Green | 161/159 |
| 3,396,419 | 8/1968 | Richter et al. | 161/159 UX |

FOREIGN PATENTS OR APPLICATIONS 234,479 7/1961 Australia ......................... 161/159

Primary Examiner—William J. Van Balen
Attorney, Agent, or Firm—Eugene M. Bond

[57] ABSTRACT

The invention disclosed provides a composite foam scouring pad formed of a reticulated hydrophilic crosslinked polyurethane foam disposed in combination with a nonreticulated hydrophilic crosslinked polyurethane foam. The scouring pad is useful for cleaning and scrubbing purposes.

20 Claims, 2 Drawing Figures

COMPOSITE FOAM SCOURING PAD

This application for U.S. Letters Patent is a continuation-in-part of application Ser. No. 332,053, filed Feb. 13, 1973.

This invention relates to a composite scouring pad having a portion formed of a reticulated hydrophilic crosslinked polyurethane foam.

Generally, numerous attempts have been made in the prior art to product reticulated foams, and particularly reticulated polyurethane foams. For example, the Volz patent, U.S. Pat. No. 3,171,820, discloses a number of methods for producing reticulated foams. One method disclosed by Volz involves subjecting a foamed opened cell, cellular polyurethane foam to hydrolytic action of water in the presence of a hydrolysis catalyst which accelerates the hydrolytic action until at least substantially all membranous polyurethane is removed from the foam. Another method described by Volz involves passing a high temperature flame front, generated by an expanding gas mixture, through a membrane-bearing, open-celled polyurethane foam. Still another method disclosed by Volz involves a prolonged exposure of an open-celled polyurethane foam to noncatalyzed aqueous hydrolytic conditions at about room temperature. In a still further method mentioned in the Volz patent, an open-celled polyurethane foam is heated in the presence of steam for a prolonged period.

Another example is U.S. Pat. No. 3,175,025 to Green who discloses a process for making reticulated polyurethane materials by providing a combustible mixture of an oxidizer material and an oxidizable material within a cellular polyurethane material having heat destructible membranes and thereafter igniting the mixture to thereby produce a reticulated structure.

In another U.S. Pat. to Green, No. 3,175,030, a method is described in which an open-celled polyurethane foam is subjected to a light pulse of sufficient intensity of energy to remove some portion of or all of the cell membranes.

The scouring nature of reticulated foams is readily apparent from the textural properties thereof. However, prior art reticulating methods generally involve damage to the resulting structure such that prolonged scouring properties are unavailable. Also, prior art scouring foams lack acceptable hydrophilic character.

It has now been found that by practice of the present invention there results a new improved scouring pad having improved scouring properties over extended periods of time and which has a highly acceptable hydrophilic character.

Figure 2:
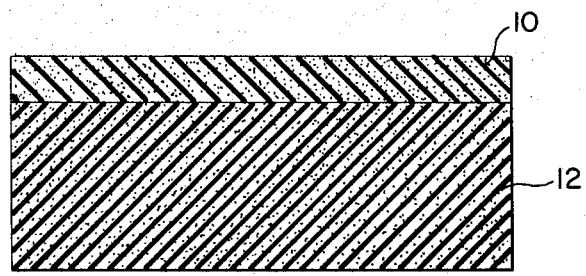

Practice of the present invention will become more apparent from the following detailed description taken in conjunction with the drawings wherein:

FIG. 1 is a perspective view of the composite scouring pad of the present invention; and FIG. 2 is a side sectional view of the scouring pad of FIG. 1 taken along section lines 2—2.

In the figures, the present scouring pad is illustrated having a reticulated hydrophilic foam layer 10, and a non-reticulated hydrophilic foam layer 12.

Generally, the present reticulated hydrophilic foam may be prepared by capping polyoxyethylene polyol with a polyisocyanate such that the capped product has a reaction functionality greater than 2. The capped product is foamed simply by combining with an aqueous reactant, a blowing agent and a surfactant. Optionally, the capped product and/or aqueous reactant may contain a suitable crosslinking agent if desired, in which case the capped polyoxyethylene polyol product may have a functionality approximating two.

The resulting reticulated foam prepared by the present method is characterized with cells which together provide a skeletal structure formed of a network of interconnected platelets, ribbons or strands.

The non-reticulated hydrophilic foam portion may be similarly prepared except excluding the necessity of a blowing agent and surfactant, the latter optionally included if desired such that a non-reticulated foam product results.

Thus, except for the reticulating components and steps necessary to effect reticulating, corresponding reactants may be employed in preparing foams used to prepare the reticulated and non-reticulated foam layers.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to about 6,000, with a hydroxyl functionality of about 2 or greater, preferably from about 2 to about 8.

Polyoxyethylene polyol is terminated or capped by reaction with a polyisocyanate. The reaction may be carried out in an inert moisture-free atmosphere such as under a nitrogen blanket, at atmospheric pressure at a temperature in the range of from about 0°C. to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are PAPPI-1 (a polyaryl polyisocyanate as defined in U.S. Pat. No. 2,683,730), tolylene diisocyanate, triphenylmethane-4,4',4"-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha,alpha'-diisothiocyanate, 3,3'-dimethyl-4, 4'-biphenylene diisocyanate, 3,3'-dimethoxy-4, 4'-biphenylene diisocyanate, 2,2',5,5'-tetramethyl-4, 4'-biphenylene dissocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio. When water is the sole reactant with the isocyanate groups to achieve chain growth during the foaming process, the isocyanate capped polyoxyethylene polyol reaction product must have an average isocyanate functionality greater than 2 and up to about 8 or more depending upon the composition of the polyol and capping agent components. Secondly, when the isocyanate capped polyoxyethylene polyol has an isocyanate functionality of only about 2, then water or aqueous reactant used must contain a dissolved or dispersed isocyanate-reactive crosslinking agent having an effective functionality greater than 2. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about 2, then a polyisocyanate crosslinking agent having an isocyanate functionality greater than two may be incorporated therein, either preformed or formed in situ, and the resultant mixture may then be reacted with water or aqueous reactant, optionally containing a dissolved or dispersed reactive isocyanate-reactive crosslinking agent, leading to a crosslinked, infinite network hydrophilic polyurethane form.

Reticulating of the foam is achieved by effecting foaming reaction in the presence of a blowing agent and a particular surfactant.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyethylene triols. The molecular weight of these polymeric triols so prepared may be varied greatly depending on the number of moles of ethylene oxide used in the reaction with the starter component. Starter components such as pentaerythritol and sucrose likewise treated with ethylene oxide lead to polymeric polyoxyethylene tetrols and octols, respectively. Alternatively, polyols suitable for capping with polyisocyanate may be prepared from diols, triols, tetrols, hexols and polycarboxylic acids such as by the following mode:

REACTION I

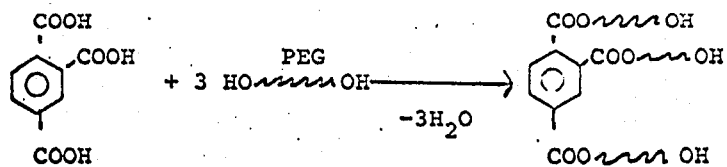

A useful polyisocyanate may be prepared from the reaction of a polyol with excess diisocyanate such as by the following mode:

REACTION II

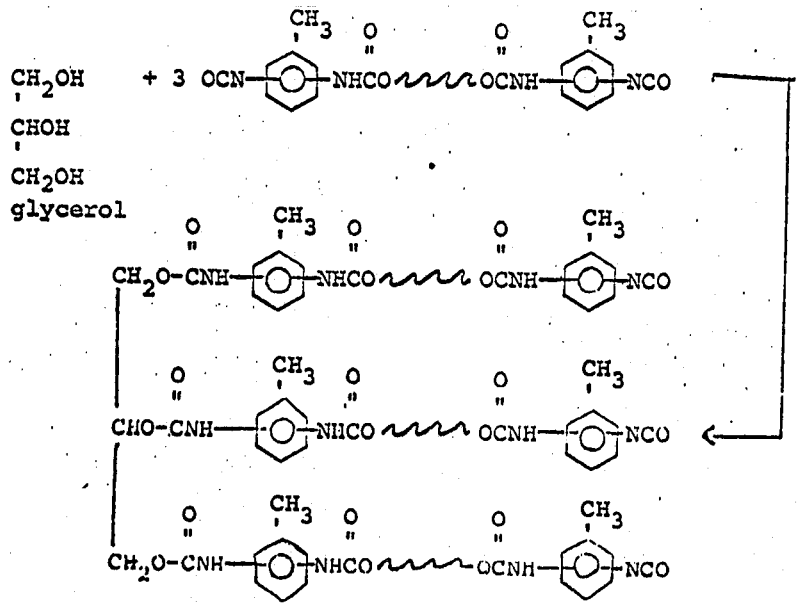

Any polyoxyethylene diols, triols, tetrols or hexols may be capped with isocyanate end groups by reaction with an appropriate amount of a polyisocyanate. The end capping reaction may be exemplified by the following illustrative equation:

REACTION III

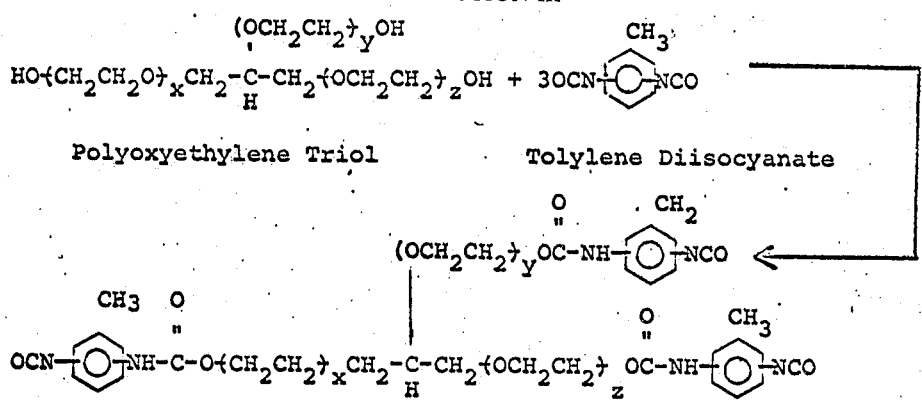

Isocyanate Capped Polyoxyethylene Triol (average functionality = 3)

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than 2.

Another possible mode used to prepare the capped polyoxyethylene polyol reaction product having an average isocyanate functionality greater than 2 is by reacting polyoxyethylene glycol having a reactive functionality equal to 2, with a molar excess of a diisocyanat which leads to an isocyanate capped polyurethane product (A) having an isocyanate functionality of 2. A polyol such as pentaerythritol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous rectants will lead to new improved hydrophilic crosslinked polyurethane foams illustrative of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionality greater than 2. An example of a polymeric triisocyanate which may be similarly used is that shown in the descriptive Reaction III.

Still another useful mode within the scope of this invention for preparing crosslinked hydrophilic polyurethane foams is by using an isocyanate capped polyoxyethylene polyol reaction product having an average functionality of about 2 or greater which may be prepared as described previously. The technique following is crucial for those formulations where the average isocyanate functionality is only about 2, because in these instances treatment with a large amount of water in foaming yields only a substantially linear, soluble thermoplastic foam having very little, if any, practical or commercial utility. Thus, when it is desired to carry out the foaming reaction using this latter technique, the water or aqueous reactant used is pre-treated to contain a polyfunctional crosslinking agent which is reactive with isocyanate end groups of the capped reaction product. Such crosslinking agents may be solubilized or dispersed in the water or aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water or aqueous reactant. After mixing with the isocyanate capped polyoxyethylene polyol reaction products, a crosslinking reaction results which takes place during and after the foaming step begins to take place. The presence of the crosslinking agent in the water or aqueous reactant is crucial when the isocyanate capped reaction product has a functionality of only about 2 and only optional when the functionality thereof is greater than 2.

Water soluble or water dispersible crosslinking agents operable in this invention desirably should be polyfunctional and reactive with isocyanate groups and include but are not limited to materials such as diethylenetriamine, triethylene-tetramine, tetraethylenepentamine, polyethyleneimine, glycerol, trimethylolpropane pentaerythritol, tolylene-2,4,6-triamine, ethylene diamine, aminoethanol, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than 2 used to prepare a three dimensional network polymer must be present in an amount sufficient to insure formation of the dimensional network. Thus, amounts of the capped polyoxyethylene polyol having an isocyanate functionality greater than 2 in the component to be foamed range from about 3% by weight of this component up to 100% by weight. Thus, it is possible to include a capped polyoxyethylene polyol having a terminal member with an isocyanate functionality of 2, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties in the finally prepared foam.

The polyoxyethylene polyols used in this invention are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously. Additional materials which effectively serve as starter materials include, for example, ethylene diamine, diethylene triamine, phosphoric acid, triethanolamine, trimethylolpropane, 2,2-dichloromethyl 1,4 butane diol or the like.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield hydrophilic crosslinked network foams when those products are used as polyol intermediates in practicing the present invention. Thus, throughout this text, the term "polyoxyethylene polyol" is intended to include not only homopolymers of ethylene oxide but also hydrophilic copolymers of ethylene oxide such as those described above wherein all of these polyol derivatives have a hydroxyl functionality of about 2 or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with a particular aqueous component. For simplicity, this isocyanate capped reaction component will herein be referred to as resin reactant.

The aqueous component may appear as water, a water emulsion, or a water solution having water soluble materials disposed therein. For convenience, the aqueous component is referred to herein as an aqueous reactant.

In contrast to typical polyurethane reactions such as those using catalyst or like promotors where one mole of —NCO is reacted with one half mole water, the present reaction proceeds simply with a large but controlled excess of water.

Using the present resin reactant and water in amounts from about 0.5 mole $H_2O$/mole NCO groups up to about 2 moles $H_2O$/mole NCO groups results in poor foaming unless materials such as surfactants or the like are included. Amounts up to about 2 moles $H_2O$/mole NCO require a catalyst. When using about 6.5 moles $H_2O$ mole/NCO groups up to about 390 moles $H_2O$/mole NCO groups, surprisingly good foams result which improve in characteristics with added amounts of molar water. Thus, the available water content in the aqueous reactant is from about 6.5 to about 390 moles $H_2O$/NCO groups in the resin reactant, and desirably from about 20 to about 200 on the same basis.

"Available water" in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The reaction temperature to effect foaming obviously is regulated by the viscosity of the resin reactant. The reaction may proceed either as a batch reaction or as a continuous reaction. Either the resin reactant may be poured into the aqueous reactant, or both may be combined simultaneously such as when using spray or froth application techniques.

Because large amounts of water may be in the aqueous reactant during reaction, i.e., the present invention is not dependent upon a molar NCO-water type reaction, it is possible to combine a great amount of additional materials into the reaction which otherwise is not possible with limited water reacting systems. It is this advantage which permits reticulation to be effected.

The blowing agents employed in the present reaction for reticulating the foam serves to generate carbon dioxide or other gas for blowing and also provides an amine radical which enters the crosslinking reaction and becomes bound into the final polymeric structure. Useful blowing agents are characterized as being isocyanates and include materials such as PAPI, a polyaryl polyisocyanate defined in U.S. Pat. No. 2,683,730; tolylene diisocyanate; triphenylmethane-4,4',4''-triisocyanate; benzene-1, 3,5-triisocyanate; toluene-2,4,6-triisocyanate; diphenyl-2,4,4'-triisocyanate; hexamethylene diisocyanate; xylene diisocyanate; chlorophenylene diisocyanate; diphenylmethane-4,4'-diisocyanate; naphthalene-1,5-diisocyanate; xylene-alpha,alpha'-diisothiocyanate; 3,3'-dimethyl-4,4'-biphenylene diisocyanate; 3,3'-dimethoxy-4,4'-biphenylene diisocyanate; 2,2',5,5'-tetramethyl-4,4'-biphenylene diisocyanate; 4,4'-methylenebis(phenylisocyanate); 4,4'-sulfonylbis(phenylisocyanate); 4,4'-methylene di-orthotolylisocyanate; ethylene diisocyanate, ethylene diisothiocyanate; trimethylenediisocyanate and the like. Mixtures of any one or more of the above mentioned organic isothiocyanates or isocyanates may be used as blowing agents herein if desired. The aromatic diisocyanates and particularly the various isomers to tolylene diisocyanate are especially suitable because they are readily commercially available, have a high degree of reactivity and a relatively low cost. Also, auxiliary blowing agents such as halocarbons, fluorocarbons, fluorohalocarbons, pentane, compressed air and the like may be used without departing from the spirit of the invention.

The amount of isocyanate blowing agent used in the present reticulating reaction is up to 35% by weight of the polymer resin, and preferably from about 2% to about 20% by weight thereof.

The surface active agent employed during reticulating of the foam is desirably a nonionic type which is soluble or dispersible in water or in the resin reactant. Examples of such surface active agents include condensates of ethylene oxide with a hydrophobic base formed by condensing propylene glycol (the well known Pluronic surfactants by Wyandotte Chemicals Corp.), and oxyethylated straight chain alcohols (the well known Plurafac surfactants also by Wyandotte Chemicals Corp.). Additionally related surface active agents may be selected provided that they are water soluble or dispersible, nonionic type, and contribute to removing the window membranes of the foam for reticulating.

The surface active agents may be admixed with the resin reactant but are included desirably by means of the aqueous reactant, and in an amount from 0.1% to about 10% by weight of the resin reactant, and desirably between about 0.5% to about 5% by weight of the resin reactant.

Although foaming of the present resin reactant is effected simply, it is also possible to add, although not necessary, supplemental foaming materials or functional additives, fillers, absorbants, antioxidants, enzymes, dyes, pigments, biocides, and the like, such as those well known to the artificial sponge foaming art. The additives can either be inert and thus physically held in the foam structure or chemically reactive with reactive species in the resin reactant in which case the additive may be bound chemically into the foam product.

In preparing the present composite structure, separate portions of reticulated foam and non-reticulated foam may be prepared and severed into desired thicknesses for ultimate use in the composite structure. Typically, the thickness of the reticulated foam layer is less than that of the non-reticulated foam layer. Nevertheless, the respective foam layers are joined by a suitable adhesive and thus prepared for usage. Alternatively, one layer may be foamed in place directly on the other layer without adhesive. The following examples will aid in explaining, but should not be deemed as limiting, practice of the present invention. In all cases, unless otherwise noted, all parts and percentages are by weight.

EXAMPLE 1

A solution of 92 grams glycerol representing 1 mole, 3 eq. OH, and 1000 grams of polyoxyethylene glycol 1000 representing 1 mole, 2 eq. OH was outgassed at 100°C. and 10 Torr for two hours. To the outgassed solution was added 870 grams representing 5 moles tolylene diisocyanate (TDI) having an 80/20 mixture of 2,4 isomer/2,6 isomer. The reaction solution was stirred at 60°C. for four hours whereupon the actual isocyanate content reached a constant 2.49 meq. NCO/gram relative to a theoretical content of 2.54. The resin product had a pale orange color, a density of 1.10, and a viscosity (Brookfield No. 4 spindle) at 25°C. of 13,400 cps. 31.3 parts of the resin product representing 50 mole percent had a theoretical molecular weight of 615, and the following formula (idealized):

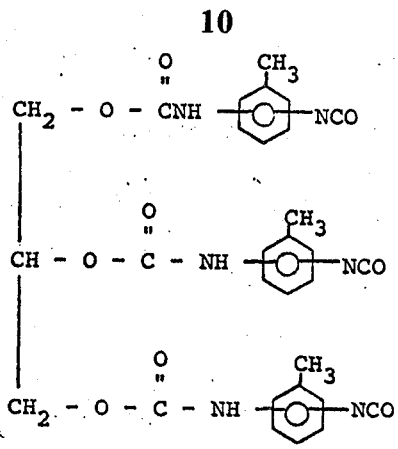

while 68.7 parts of the resin product representing 50 mole percent was found to be

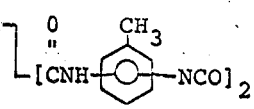

having a theoretical molecular weight of 1348. The actual NCO content of this resin product was 2.49 meq. NCO/gram relative to a theoretical content of 2.54 meq. NCO/gram.

Two hundred grams of the recovered resin having an NCO equivalent of 0.5 was reacted with 200 grams of water representing 11 moles and a mole $H_2O$/NCO group ratio of 22. A foam product was recovered having small, uniform open cells which were cut to size and used as layer 12 of FIG. 1.

EXAMPLE 2

The procedure of Example 1 was repeated except further including in the resin portion 20 grams of tolylene diisocyanate (TDI having about 80/20 mixture of 2,4 isomer/2,6 isomer), whereas in the water component there was included 2 grams of Pluronic P-75, a nonionic surfactant by Wyandotte Chemicals Corp. for condensate of ethylene oxide with a hydrophobic base formed by condensing propylene oxide with propylene glycol.

A reticulated foam product resulted which was cut to size and used as layer 10 of FIG. 1. The layers were joined by using a polyurethane adhesive.

EXAMPLE 3

The procedure of Example 2 was repeated except using 30 grams of 4,4'-methylenebis(phenylisocyanate), 0.02 gram of ethyl violet dye disposed in the water reactant, 3 grams of Pluronic L-64, a liquid surfactant by Wyandotte having a typical molecular weight of 2900 and chemically corresponding generally to Pluronic P-75. The recovered product was found to have a reticulated structure characterized with a coarse abrasive network. The recovered product proved useful as an abrasive sponge cleaning pad as layer 10 of the composite of FIG. 1.

EXAMPLE 4

The procedure of Example 1 was repeated using a resin prepared by reacting 69 grams glycerol representing 0.75 mole, 2.22 eq. OH; and 740 grams TDI. The actual isocyanate content was found to be 2.40 meq./gram relative to a theoretical isocyanate content of 2.30 meq./gram. The viscosity of the resin was 8,300 cps at 25°C. (Brookfield No. 4 spindle). A recovered foam product was characterized with a reticulated configuration having very high hydrophilic character having utility as layer of the composite of FIG. 1.

EXAMPLE 5

The procedure of Example 4 was repeated using the resin therein prepared with 2 grams TDI. The recovered resin with TDI was reacted with the water reactant containing 2 grams Plurafac B26, an oxyethylated straight chain alcohol nonionic surfactant by Wyandotte Chemicals Corp., 3.3 grams Thancat DD catalyst, and 0.5 gram phthalocyanine blue pigment. The recovered product had a finely reticulated foam configuration having the ability to be wet almost instantaneously by water. The product foam was found to have utility as layer 10 of the composite scouring pad of FIG. 1.

EXAMPLE 6

The procedure of Example 4 was repeated except using MDI in place of TDI and further including 0.5 gram hexachlorophene germicide in the water reactant. A corresponding foam scouring pad resulted.

EXAMPLE 7

The procedure of Example 4 was repeated except further including 20 grams calcium carbonate in the water reactant. The product foam was characterized with a firmer texture, and had superior performance as a wiping sponge and scouring pad.

EXAMPLE 8

The procedure of Example 6 was repeated except using sodium propionate moldicide in place of the germicide. A corresponding foam scouring pad resulted.

It is to be understood that the foregoing detailed description is given merely by way of illustration and that many variations may be made therein without departing from the spirit of this invention.

What is claimed is:

1. A scouring pad which comprises in combination, a non-reticulated hydrophilic foam layer and a reticulated hydrophilic foam layer, said reticulated hydrophilic foam layer having cells formed of a network of interconnected platelets, ribbons and strands and three-dimensional networks by reacting onto the non-reticulated hydrophobic foam layer a hydrophilic foam composition comprising a mixture of a first component comprising isocyanate capped polyoxyethylene polyol having a reaction functionality greater than 2, with a second component comprising aqueous reactant, the ratio of moles $H_2O$/moles NCO groups being about 6.5 to about 390 in said second and first components respectively, while in, the presence of a blowing agent and a nonionic surfactant so as to form said reticulated foam.

2. The scouring pad of claim 1 wherein the non-reticulated hydrophilic foam layer has a three-dimensional network by reacting a first component comprising isocyanate capped polyoxyethylene polyol having a reaction functionality greater than 2, with a second component comprising aqueous reactant, the ratio of moles $H_2O$/moles NCO groups being about 6.5 to about 390 in said second and first components respectively.

3. The scouring pad of claim 1 wherein the capped polyoxyethylene polyol is present in the first component in an amount from about 3% by weight up to 100% by weight, and wherein a capped polyoxyethylene polyol having a terminal member with an isocyanate functionality of 2 is present in an amount from 0% up to about 97% by weight.

4. The scouring pad of claim 2 wherein the polyoxyethylene polyol moiety of the isocyanate capped member has a weight average molecular weight of about 200 to about 20,000, and a hydroxyl functionality of about 2 to about 8.

5. The scouring pad of claim 4 wherein the weight average molecular weight is about 600 to about 6,000.

6. The scouring pad of claim 2 wherein the ratio of moles $H_2O$/moles NCO groups is from about 20 to about 200.

7. The scouring pad of claim 1 wherein the blowing agent is an isocyanate containing member.

8. The scouring pad of claim 1 wherein the surfactant is a condensate of ethylene oxide with a hydrophobic base formed by condensing propylene oxide with propylene glycol.

9. A scouring pad which comprises in combination, a non-reticulated hydrophilic foam layer and a reticulated hydrophilic foam layer, said reticulated hydrophilic foam layer having cells formed of a network of interconnected platelets, ribbons and strands and three-dimensional networks by reacting onto the non-reticulated hydrophobic foam layer a hydrophilic foam composition comprising a mixture of a first component comprising isocyanate capped polyoxyethylene polyol having a reaction functionality equal to about 2, a second component comprising aqueous reactant, and a third component comprising a crosslinked agent having a reaction functionality greater than 2, the ratio of moles $H_2O$/moles NCO groups being about 6.5 to about 390 in said second and first components respectively, and in the presence of a blowing agent and a nonionic surfactant so as to form said reticulated foam.

10. The scouring pad of claim 9 wherein the non-reticulated hydrophilic foam layer has a three-dimensional network by reacting a first component comprising isocyanate capped polyoxyethylene polyol having a reaction functionality greater than 2, with a second component comprising aqueous reactant, the ratio of moles $H_2O$/moles NCO groups being about 6.5 to about 390 in said second and first components respectively.

11. The scouring pad of claim 9 wherein the non-reticulated hydrophilic foam layer has a three-dimensional network by reacting a first component comprising isocyanate capped polyoxyethylene polyol having a reaction functionality equal to about 2, a second component comprising aqueous reactant, and a third component comprising a crosslinked agent having a reaction functionality greater than 2, the ratio of moles $H_2O$/moles NCO groups being about 6.5 to about 390 in said second and first components respectively.

12. The scouring pad of claim 9 wherein the crosslinking agent of the third component is a polyol.

13. The scouring pad of claim 9 wherein the crosslinking agent of the third component is a polythiol.

14. The scouring pad of claim 9 wherein the crosslinking agent of the third component is a polyamine.

15. The scouring pad of claim 9 wherein the crosslinking agent of the third component is a polyisocyanate.

16. The scouring pad of claim 9 wherein the polyoxyethylene polyol moiety of the isocyanate capped member has an average molecular weight of about 200 to about 20,000, and a hydroxyl functionality of about 2 to about 8.

17. The scouring pad of claim 16 wherein the weight average molecular weight is about 600 to about 6,000.

18. The scouring pad of claim 9 wherein the ratio of moles $H_2O$/moles NCO groups is from about 20 to about 200.

19. The scouring pad of claim 9 wherein the blowing agent is an isocyanate containing member.

20. The scouring pad of claim 9 wherein the surfactant is a condensate of ethylene oxide with a hydrophobic base formed by condensing propylene oxide with propylene glycol.

* * * * *